United States Patent
Klug

[11] 3,729,994
[45] May 1, 1973

[54] FLOW METERING SYSTEM FOR LIQUID WASTES

[76] Inventor: Henry G. Klug, 2029 N. 67th Avenue, Omaha, Nebr.

[22] Filed: Feb. 7, 1972

[21] Appl. No.: 224,214

Related U.S. Application Data

[63] Continuation of Ser. No. 56,329, July 20, 1970.

[52] U.S. Cl. ...................................73/194 E, 73/215
[51] Int. Cl. ..............................................G01f 1/00
[58] Field of Search................73/215, 194 E, 304 C; 324/61 R

[56] References Cited

UNITED STATES PATENTS

| | | | |
|---|---|---|---|
| 2,852,937 | 9/1958 | Maze | 73/304 C |
| 3,230,770 | 1/1966 | Hermanson | 73/304 C |
| 3,269,180 | 8/1966 | Schreiber | 73/215 |
| 3,342,138 | 9/1967 | Parks et al. | 324/61 R |

Primary Examiner—Charles A. Ruehl
Attorney—Hiram A. Sturges

[57] ABSTRACT

A liquid flow metering system comprising a flow conduit, many of such conduits having a dielectric lining supported for strength by a moisture bearing material such as concrete, the concrete itself often having still other moisture bearing material on the outside of it such as dirt, a capacitive electrode imbedded in or attached to a side wall of the conduit, a dielectric medium disposed between the capacitive electrode and the moisture-bearing concrete, dirt or other material, the dielectric medium being disposed on the side of the capacitive electrode which faces away from the center of the conduit to prevent the capacitive electrode from sensing the moisture in the concrete, dirt, or other moisture-bearing material whereby the capacitive electrode senses only liquid in the conduit so as to give accurate sensing thereof.

24 Claims, 12 Drawing Figures

Patented May 1, 1973

Patented May 1, 1973

FLOW METERING SYSTEM FOR LIQUID WASTES

This is a continuation, of application Ser. No. 56,329 filed July 20, 1970.

FIELD OF THE INVENTION

This invention is in the field of metering of liquids by means of metallic sensors by the flow through a conduit, and particularly valuable when the liquids contain solid waste which clings high on a sensor after a level has gone down, and since the wastes are set, giving a false indication of high metering level.

DESCRIPTION OF THE PRIOR ART

A traditional apparatus for measuring liquid waste involves a float in a float chamber connected by a pipe to a liquid flow conduit so that the liquid level in the float chamber is the same as that in the conduit.

One of the disadvantages of such a float measurement system is that clogging can occur in the connecting pipe which is often a two-inch pipe, such clogging being frequently at the entrance to the pipe from the conduit.

Float systems have had the further problem that sewage sticking to the walls of a flat chamber has tended to interfere with operation. It has been necessary to go to the expense of supplying fresh water for trickling down the side walls of the float chamber in order to keep sewage from sticking to these walls.

The conduit referred to is sometimes of the type which is called a "flume". A flume commonly has an open top and has carefully controlled measurements and further has a bottom surface which is carefully constructed so that it is substantially level so that liquid flow over one portion thereof is substantially the same as liquid flow over other portions of the bottom of the flume. It is to such flumes that float chambers have been connected.

In some measuring systems, the fluid waste conduit is what is called an open-flow nozzle. Ball-float measuring systems have also been used with open-flow nozzles. The ball-float method of measurement has a disadvantage in that it will not measure when the flow shuts off. In order to measure when the flow shuts off, it is necessary to be able to measure the presence of even the smallest trickle of fluid. This has been impossible with ball-float systems.

Capacitance probes have been used in liquid flow situations where there is no floating solid waste and no problem of clogging by a build-up of waste materials caught on a probe. But where there is waste material, there is a danger not only of a clog building up on the probe, but also damage to the probe itself.

In these uses where waste is not present, a probe still has a disadvantage that it will not measure the shutting off of flow because insulating materials coating the probe tend to hold the lower end of the probe away from the bottom of a conduit so that approximately the last one-eighth of an inch of a probe assembly is only insulating material and the metallic part of the probe does not extend to the bottom of the conduit and cannot measure the smaller flow. Measurement of the smallest flow to indicate when flow shuts off is important so as to provide what is called a "live zero", a factor known to metering people to be important in calibrating the electronic instrumentation that words with the capacitance probe.

Because of the insulation, approximately the last one-eighth inch of the probe assembly is not metallic and cannot sense water flow alongside itself.

In U.S. Pat. No. 3,269,180, issued Aug. 30, 1966, to D. S. Schreiber, and titled: CAPACITIVE ELECTRODE FOR FLOW MEASUREMENT IN OPEN CHANNELS, since the flumes are conventionally made of concrete with a thin fiberglass lining, the moisture in the concrete would affect the capacitance of the sensor, giving a false reading. Also the conductive metal plate on the other side of the sensor would seriously detract from accuracy of reading because such a plate has a "condensor effect", whereby when there is moisture in concrete on the outer side of the plate, the detraction of this moisture from accuracy of fluid level readings would, not only not be helped by the plate, but instead, the plate would multiply inaccuracies because of the condensor effect.

The Schreiber electrodes are encased in insulating material, but this is very, very thin material of sufficient thickness for only the purpose of direct electrical conductance insulation, and is not for the purpose of, nor thick enough to protect the electrode from the effect of moisture in the concrete casing in which fiberglass conduits are usually set.

SUMMARY OF THE INVENTION

A liquid flow metering system comprising a flow conduit having a flow of liquid therethrough containing solid waste materials, an elongated electronically conductive sensor disposed adjacent a sidewall of the conduit and firmly attached to the sidewall to prevent flowing solid waste from damaging the sensor, the sensor being attached in a manner such that waste cannot become clogged in a space between the sensor and the conduit, and a capacitance responsive flow level transmitter attached to the upper end of the sensor, many of such conduits having a dielectric lining supported for strength by a moisture-bearing materials such as concrete, the concrete itself often having still other moisture-bearing material on the outside of it such as dirt, and a dielectric medium disposed between the sensor and the moisture-bearing concrete, dirt or other material, the dielectric medium being disposed on the side of the sensor which faces away from the center of the conduit to prevent the sensor from sensing the moisture in the concrete, dirt, or other moisture-bearing material whereby the sensor senses only liquid in the conduit so as to give accurate sensing thereof.

The sensor extending below the lowermost level of the interior of the bottom wall of the conduit so as to measure even very small flow so that the transmitter can signal what is substantially a ceasing of flow.

The combination described in which the sensor has a portion extending transversely to its vertically elongated main sensing portion, the transverse portion being disposed below the bottom wall of the conduit.

The system further having the conduit portion of insulating material in which the sensor is imbedded.

The sensor being substantially U-shaped with a lower portion extending across the bottom of the conduit and side portions extending up the sides of the conduit.

The system in which the sensor is on the inner side of the sidewall of the conduit and means is provided attaching the sensor to the sidewall with material provided on the upstream edge of the sensor tapering from a thicker outer end farthest from the conduit sidewall to a thinner inner side at the sidewall to prevent stoppage of waste and clog build-up.

DESCRIPTION OF THE PREFERRED EMBODIMENT

Figure 1:
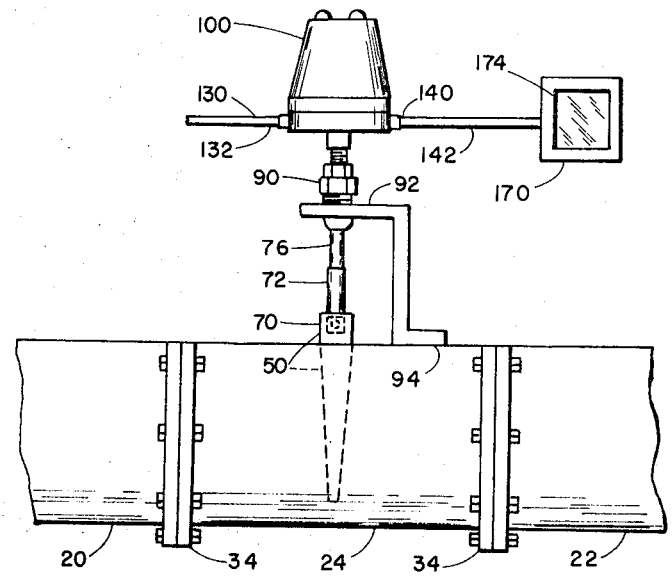
FIG. 1 is a side elevation of an open-flow nozzle conduit having a special section made of an insulating material forming a part thereof, and shown with the liquid flow metering system of this invention mounted thereon and partially shown in dotted lines.
Figure 2:
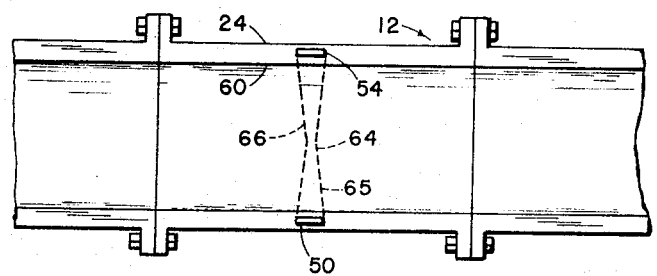
FIG. 2 is a top plan view of only the conduit and sensor portions of FIG. 1, part of the sensor shown in dotted lines.

The liquid flow metering system of this invention is generally indicated at 10 in FIG. 1 in one of its forms and is shown as mounted on an open flow nozzle generally indicated at 12, the nozzle 12 also being referred to herein as a conduit 12.

Figure 3:
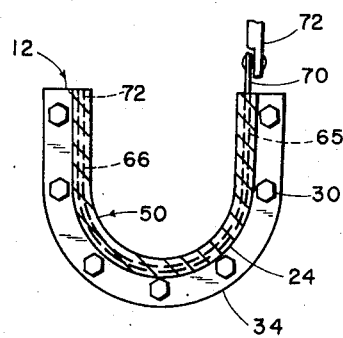
FIG. 3 is a view of the parts of FIG. 2 as seen from the left end and a portion of an electrical connection element attached to the top of the sensor.
Figure 4:
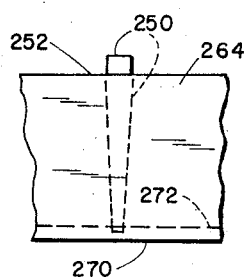
FIG. 4 is a side elevation of an open sewage flume shown with the sensor of this invention mounted therein as shown in dotted lines, end portions of the flume being broken away, and FIG. 4 showing a modification of the invention.

The open flow nozzle 12 has two metallic sections 20 and 22 and a central section 24 formed of an insulating material of a type that can be molded, such as fiberglass, the section 24 being connected to the sections 20 and 22 by bolts 30 which extend through end flanges 34 of the insulating central section 24 in which is imbedded an elongated electrically conductive sensor 50 which is imbedded in the insulating central section 24 so that the U-shaped sensor or capacitive electrode 50 has one side portion 54 imbedded in and extending vertically through a sidewall 60 of the section 24, which latter is substantially U-shaped in cross-section, as seen in FIG. 3.

The sensor 50 has a narrowest point adjacent the middle of the bottom of the conduit or open flow nozzle 12 as shown at 64, the sensor having two portions 65 and 66 extending to the right and to the left of the point 64 as seen in FIG. 3, each of which are of gradually increasing width as their upper ends 70 and 72 are approached.

The sensor 50 is of oblong rectangular shape in cross-section with its inner flat side facing the center of a section 24.

One of the upper ends of the sensor is shown at 70 and is connected by a connector 72 to a gland type coupling 90 which is supported on a bracket 92 attached to the top of the conduit or open flow nozzle section 24, as shown at 94.

Above the coupling 90 and attached thereto is a capacitance responsive flow level transmitter generally indicated at 100, which is adapted to send an electronic signal proportional to the height of the water or liquid in the conduit or nozzle 12. Sewage or other waste in the water flowing in the nozzle 12 will be so water-saturated as not to interfere with the water level sensing by the capacitance sensor 50.

The housing of the level transmitter 100 is at earth ground potential.

The flow level transmitter assembly 100, such as the model 156 transmitter, called the Level-Tel Transmitter manufactured by the Aeronautical and Instrument Division of the RobertShaw Controls Company, Santa Ana Freeway, at Euclid Street, Anaheim, Calif., and the assembly 100 is of a type into which two wires 130 and 132 connect carrying 100-volt current of 60 cycles. Two other wires 140 and 142 lead from the transmitter assembly 100 to a time-graduated ink recorder or totalizer indicating total flow per time unit, the recorder or totalizer being shown at 170 with its reading window diagrammatically at 174.

It is essential at all times for stability of the measuring circuit, that the flowing liquid be at the same ground potential as the insulated gland coupling 90 which supports the level sensing probe. Normally, this is accomplished by connecting the enclosure of the flow transmitter enclosure 100 to the threaded portion of the insulated gland or holder supporting the level sensing probe, and then connecting the flow transmitter enclosure to a rigid metallic conduit, not shown, but delivering fluid to the nozzle or conduit 12, with the metallic conduit maintained at ground potential through the earth-grounding practices common to standard electrical equipment installation.

A spacing wall 300 is provided in FIG. 5, and is attached to the flume 264, and is filled by Styrofoam or other insulating material adapted to form a barrier to insulate the sensor from moisture in a later described concrete supporting portion 326 of the flume, as shown at 320, for holding moisture away from the immediate area of the sensor 280 to prevent moisture in the ground from interfering with the capacitance effect of the sensor 280, so that it substantially reads only liquid flow in the flume 264.

The flumes are often set in a solid support means which is concrete as is indicated at 326 which latter is upheld by dirt, shown at 340 in which case, the conduit or flume 264 can be considered a dielectric liner for the concrete 326, which latter is a solid support means for the liner or conduit 264.

Figure 7:
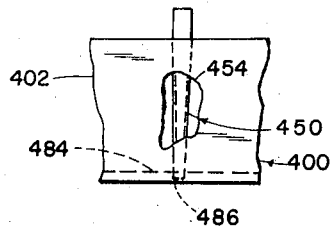
FIG. 7 is a side elevation of a portion of a flume with the sensor of this invention of modified type mounted on the inside of a sidewall thereof, a portion of the flume or conduit being broken away.
Figure 8:
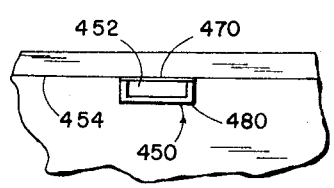
FIG. 8 is a top plan view of a portion of the sidewall and bottom of a flume of FIG. 7 with the sensor of this invention mounted thereon.

Referring to FIG. 7, a conduit or flume is there shown at 400 and its nearest side wall 402 is shown with a portion broken away for showing a sensor assembly 450 disposed against an opposite wall 454 of the flume 400. The flume 400 is U-shaped in cross-section similarly to the flume in FIG. 5. In FIG. 8, the sensor assembly 450 is shown in greater detail and comprises a metallic capacitance sensor 452 bonded to the side wall 454, by bonding material 470 which can be fiberglass, the other three sides of the sensor 452 being covered by a coating of an electrical insulating material such as the Teflon at 480. The sensor 452 extends beyond the bottom wall interior 484 of the flume as best seen in FIG. 7, at 486, so as to sense very low flow and the ceasing thereof.

Figure 9:
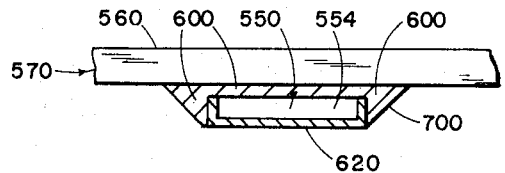
FIG. 9 is a view of the sidewall of a flume with the sensor of this invention mounted thereon, in modified manner.

FIG. 9 shows a further modification of the sensor assembly at 550, in which the sensor itself is shown at 554, being attached to the vertical side wall 560 of a flume 570, the rest of which is broken away, the sensor 554 being attached to the sidewall 560 by fiberglass 600. Suitable electrical insulating material is shown at 620 between the sensor 554 and the interior of the flume 570 on the inner side of the sensor 554. Each of the electrodes 250, 450, 550, 280′ or 280″ and its respective one of the conduits 264, 400, 570, 264, and 264, and its respective dielectric medium 320 in each case together define respective fluid flow conduit and electrode assemblies, which latter assemblies also include respective spacing wall 300, when used.

The sensor 554 and the attaching means of fiberglass 600 and the insulating means, which can be Teflon 620, and the conduit 570 all together forming an assembly, the assembly having material shown at 700 at the upstream edge of the sensor 554 which tapers from the thicker outer end farthest from the conduit side wall 560, as seen in top plan view in FIG. 9, to a thinner inner end at the side wall 560, so as to provide a tapered deflector to prevent waste from catching on the sensor and to prevent clog build-up.

Figure 5:
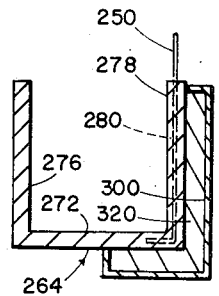
FIG. 5 shows another modification of the invention showing a vertical cross-section through a flume with the sensor of this invention imbedded therein and a spacing wall assembly mounted thereon.

In the modification of FIG. 5, a transverse portion 600 of the sensor is attached to its vertical portion and extends inwardly of the conduit under, and parallel to, the interior of the bottom wall of the conduit of flume 264 a short distance, such as one inch with a sensor of a thickness in a direction away from the open center of the conduit of one-sixteenth of an inch generally and a sensor width parallel to the direction of flow through the conduit of approximately one-sixteenth of an inch to give a more accurate "live zero" for indicating the ceasing of flow.

Figure 6:
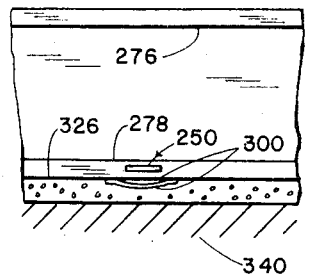
FIG. 6 is a top plan view of the modification shown in FIG. 5 with a portion of concrete and of earth shown.
Figure 10:
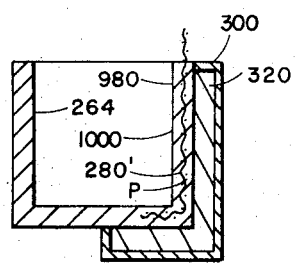
FIG. 10 is a view similar to FIG. 5, but of a modification in which the capacitive electrode is of woven wire.
Figure 11:
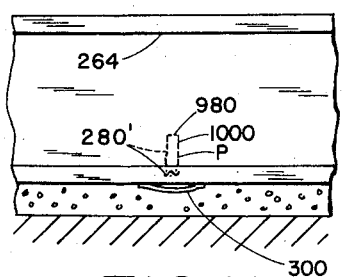
FIG. 11 is a view similar to FIG. 6, but of the modification in which the capacitive electrode is of woven wire and is shown partially in dotted lines.
Figure 12:
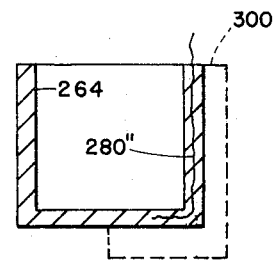
FIG. 12 is a view similar to FIG. 5, but of a modification in which the capacitive electrode is corrugated, and in which only the outline of the dielectric medium spacing wall is diagrammatically shown in dotted lines.

The sensor is preferably made of metallic woven wire mesh material, as shown at 280′ in FIGS. 10 and 11, so as to permit a flexing to cause the sensor to yield with expansions and contractions in the polyester reinforced fiberglass conduit portion or flume 264 in which the sensor is imbedded so as to prevent separation of the conduit portion from the sensor. For the same reasons of need for flexing, the sensor can be made in undulating or corrugated shape as seen in vertical cross-section as shown at 280″ in FIG. 12. Referring to FIG. 6, since the conduit or flume 264 is made of fiberglass it will be seen to be formed of a dielectric material which is waterproof and a better moisture barrier than the concrete of the solid support means 326 in which the fume is set.

In FIGS. 10 and 11 it will be seen that a portion 980, of the conduit 264 itself, forms an attachment and insulation assembly, generally indicated at 100, which latter firmly attaches the electrode 280′ to the conduit 264.

The conduit portion 980 (and, therefore, the attachment and insulation assembly 1000 itself) has a part P thereof disposed between the electrode 250 and the interior of the conduit 264, the part P electrically insulating the electrode 250 from the contents of the interior of the conduit 264, and preventing said contents from becoming disposed between the electrode 280′ and the dielectric medium 320 along preferably all of, but along at least the majority of, the height of the electrode 280′.

I claim:

1. A fluid flow conduit and electrode assembly for use in a metering system for measuring flow of electrically conductive fluid comprising a flow conduit for receiving flow of said liquid therethrough, said conduit having a bottom wall, said conduit having upstanding sidewalls, said sidewalls having inner surfaces, a capacitive electrode disposed in the close vicinity of at least one of said sidewalls of said conduit, said conduit having an inlet and an outlet defining a direction for flow, an attachment and insulation assembly firmly attaching said electrode to said conduit, said latter assembly having a part thereof disposed between said electrode and the interior of said conduit and electrically insulating said electrode from contents of said interior, said electrode having a suitable terminal connectable to a capacitance responsive flow level transmitter assembly adapted to send electric signals proportional to the height of said fluid in said conduit, and a substantially dielectric medium disposed on that outer side of said electrode which faces away from the interior of said conduit and occupying a space of such a size as to substantially electrically insulate said outer side of said electrode for flow height measurement purposes from capacitance change from conductive materials which might be disposed on the opposite side of said dielectric medium from said electrode.

2. The combination of claim 1 in which said dielectric medium has a spacing wall means associated therewith and attached to said conduit enabling said medium to hold the position described in use.

3. The combination of claim 1, the total size, position and total electrical conductivity of materials on said outer side of said electrode being such as not to substantially detract from the effectiveness of said electrode for assisting flow height measurement by capacitance change of said electrode.

4. The combination of claim 1 in which said electrode extends completely down to the lowermost level of the bottom wall of said conduit in order to measure very low flow.

5. The assembly of claim 1 further comprising: the shape of said electrode being contoured as seen looking in a direction at a right angle to said direction for flow for giving different capacitance readings at different height levels of fluid, a solid support means capable of holding moisture disposed on that side of said electrode which is disposed away from said conduit, said medium being between said electrode and said means capable of holding moisture, said medium extending in a direction horizontally away from a center of the interior of said conduit a distance from said electrode which is substantially greater than the average thickness of said one sidewall.

6. The combination of claim 5 in which said conduit has a dielectric solid liner on the inner side of said solid means.

7. The combination of claim 5 in which said conduit has a liner on the inner side of said solid means, said liner being formed of a material which is a better moisture barrier than said solid support means.

8. The combination of claim 1 in which said electrode extends below the lowermost level of the interior of the bottom wall of said conduit so as to measure even very small flow so that said transmitter can signal what is substantially a ceasing of flow.

9. The combination of claim 1 in which said conduit has a portion thereof formed of electrically insulating material and said electrode being imbedded in said material of said conduit.

10. The combination of claim 9 in which said conduit and said electrode are of greatly differing thermal expansion characteristics and in which said electrode is of lesser rigidity than said conduit, and said electrode being of sufficient flexibility as to substantially prevent cracking of said conduit from difference in said thermal expansion characteristics of said electrode and said conduit.

11. The combination of claim 9 in which said electrode is substantially formed of woven wire mesh.

12. The combination of claim 9 in which said electrode is substantially formed of a metallic material having an undulating shape in vertical cross-section.

13. The combination of claim 1 in which said electrode is substantially U-shaped and extends across the bottom of said conduit and said one sidewall as described and also up the other sidewall.

14. The combination of claim 1 in which the space between said electrode and those portions of said dielectric medium which are spaced farthest from said electrode is free of any conductive substance of such substantial size and nature as to substantially interfere with the electrical sensitivity of said electrode for helping to detect flow height in said conduit.

15. The assembly of claim 14 in which combination with a transmitter as described which is operably connected to said electrode terminal.

16. The combination of claim 1 in which a spacing wall is disposed across a substantial area of that side of said dielectric medium which faces away from said electrode, said spacing wall being attached to said conduit, that side of said spacing wall which faces said electrode being concave for forming a space between said spacing wall and said conduit in which said dielectric medium is disposed, said spacing wall being of a stronger material than said dielectric medium.

17. The combination of claim 1 in which said electrode extends completely down to the lowermost level of the bottom wall of said conduit in order to measure very low flow.

18. The combination of claim 1 in which said electrode has a main sensing portion disposed upright and a lower portion extending transversely to said main sensing portion and inwardly generally toward a center of the bottom of said conduit, said transverse portion being disposed below the bottom wall of the conduit.

19. The assembly of claim 1 in further combination with a transmitter as described which is operably connected to said electrode terminal.

20. The assembly of claim 1 further comprising a solid support means capable of holding moisture disposed on that side of said electrode which is disposed away from said conduit, said medium being between said electrode and said means capable of holding moisture, said medium extending in a direction horizontally away from a center of the interior of said conduit a distance from said electrode which is substantially greater than the average thickness of said one sidewall.

21. The combination of claim 20 in which said conduit has a liner on the inner side of said solid means, said liner being formed of a material which is a better moisture barrier than said solid support means.

22. The assembly of claim 20 in further combination with a transmitter as described which is operably connected to said electrode terminal.

23. The assembly of claim 1 in which said attachment and insulation assembly is disposed in a position for blocking fluid from said interior from becoming disposed between said electrode and said dielectric medium along at least the majority of the height of said electrode.

24. The assembly of claim 23 in further combination with a transmitter as described which is operably connected to said electrode terminal.

* * * * *